(12) United States Patent
Fischer et al.

(10) Patent No.: US 6,521,326 B1
(45) Date of Patent: Feb. 18, 2003

(54) WELDED COMPOSITES THAT CONSIST OF GLASS-FIBER REINFORCED MOLDED PARTS THAT WERE PRETREATED WITH EPOXYPOLYMERS

(75) Inventors: Michael Fischer, Ludwigshafen (DE); Walter Rau, Mannheim (DE); Martin Welz, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/979,120

(22) PCT Filed: Jun. 23, 2000

(86) PCT No.: PCT/EP00/05865

§ 371 (c)(1),
(2), (4) Date: Nov. 19, 2001

(87) PCT Pub. No.: WO01/00409

PCT Pub. Date: Jan. 4, 2001

(51) Int. Cl.[7] .............................. B32B 5/02; B32B 7/00; B32B 7/04; B32B 27/20; B32B 27/36

(52) U.S. Cl. ........................ 428/198; 428/375; 428/391; 428/412; 428/480; 428/483; 428/903.3; 156/272.2; 156/275.1; 156/297

(58) Field of Search ................................ 428/198, 375, 428/391, 412, 480, 483, 903.3; 156/272.2, 297, 275.1

(56) References Cited

U.S. PATENT DOCUMENTS 4,486,373 A * 12/1984 Kurauchi et al. ........... 264/137
5,712,036 A * 1/1998 Piret ........................... 428/378
6,025,073 A * 2/2000 Piret ........................ 427/372.2
6,045,912 A * 4/2000 Taguchi ....................... 428/357

FOREIGN PATENT DOCUMENTS

| EP | 0 220 513 | 5/1987 |
| EP | 0 370 512 | 5/1990 |
| JP | 57156251 | 9/1982 |

* cited by examiner

Primary Examiner—Vivian Chen
(74) Attorney, Agent, or Firm—Keil & Weinkauf

(57) ABSTRACT

A composite is composed of at least one first molding and one second molding, where the first molding and the second molding have been immovably bonded to one another via at least one partial region of one surface α of the first molding and of one surface β of the second molding, via a welded region, and where, based on the first molding, at least 50% by weight of the first molding is composed of a molding composition comprising:

A) from 5 to 99% by weight of a polyester,
B) from 1 to 95% by weight of a fibrous filler pretreated with an aminosilane compound and with an epoxy polymer,
C) from 0 to 30% by weight of an elastomeric polymer, and
D) from 0 to 40% by weight of other additives, where the total of the percentages by weight of components A) to D) is 100%.

Laminates made from these composites, and products produced therefrom and recycled materials obtained therefrom, are described, as is the use of all of these, in particular in automotive construction.

18 Claims, No Drawings

WELDED COMPOSITES THAT CONSIST OF GLASS-FIBER REINFORCED MOLDED PARTS THAT WERE PRETREATED WITH EPOXYPOLYMERS

The invention relates to composites with welded regions and composed of moldings formed from thermoplastic molding compositions, and also to laminates made from these composites and to products produced therefrom and to recycled materials obtained therefrom, and also to the use of all of these, in particular in automotive construction.

There are many examples of applications for polyesters. For reinforced polyesters, preference is generally given to pretreated fillers, since these improve the adhesion between polymer matrix and filler and consequently affect many other technical properties.

Particularly preferred surface-treatment agents for the fillers here are epoxysilanized sizes or epoxy compounds (WO-A 94/24201).

If the abovementioned molding compositions are used to form moldings and these moldings are joined together to give composites with formation of welded seams, these welded seams have an ultimate tensile strength which is considerably lower than that of the molding itself if it were identically shaped. The ultimate tensile strength of the welded seams in these composites is generally not more than about 20% of the ultimate tensile strength of the moldings themselves if they were identically shaped, and this has an adverse effect on the ultimate tensile strength of the actual composites formed when compared with that of the moldings if they were identically shaped. This is particularly disadvantageous if composites are to be formed from two or more moldings where it is intended that the welded seams should not have dimensions larger than the moldings from which the composites are formed, as is the case, for example, with welded seams which are to remain invisible.

It is an object of the present invention, therefore, to improve the material properties, in particular the ultimate tensile strength, of the welded regions produced between the individual moldings within the composite.

We have found that this object is achieved by a composite composed of at least one first molding and second molding, where the first molding and the second molding have been immovably bonded to one another via at least one partial region of one surface α of the first molding and of one surface β of the second molding, via a welded region, and where, based on the first molding, at least 50% by weight of the first molding is composed of a molding composition comprising:

A) from 5 to 99% by weight of a polyester,
B) from 1 to 95% by weight of a fibrous filler pretreated with an aminosilane compound and with an epoxy polymer,
C) from 0 to 30% by weight of an elastomeric polymer, and
D) from 0 to 40% by weight of other additives,
where the total of the percentages by weight of components A) to D) is 100%.

The balance amount of the moulding compound of the first structural part consists either of the components A to D as subsequently defined or consists of at least one polymer homogeneously miscible or compatible with said component A or of another polyester different from component A or of a polycarbonate or of a, poly(styrene-co-acrylonitrile).

The second structural part either has the same composition as the first structural part or consists of a moulding compound containing the components A to D as subsequently defined (fiber-reinforced structural part) in a composition different from the composition of the moulding compound of the first structural part.

In a preferred embodiment, the content of component B in said moulding compound of the second structural part is 0% by weight (fiber-non-reinforced structural part).

Moreover, the moulding compound of the second structural part may contain at least one additional component different from the components A to D, said additional component preferably being homogeneously miscible or compatible with said component A and preferably being another polyester different from component A or a polycarbonate or a poly(styrene-co-acrylonitrile).

The molding compositions according to the invention comprise, as component A), from 5 to 99% by weight, preferably from 20 to 98% by weight and in particular from 25 to 80%, by weight of a preferably thermoplastic polyester.

Use is generally made of polyesters based on aromatic dicarboxylic acids and on an aliphatic or aromatic dihydroxy compound.

A first group of preferred polyesters is that of polyalkylene terephthalates whose alcohol moiety has from 2 to 10 carbon atoms.

Polyalkylene terephthalates of this type are known per se and are described in the literature. Their main chain contains an aromatic ring which derives from the aromatic dicarboxylic acid. There may also be substitution of the aromatic ring, e.g. by halogen, such as chlorine or bromine, or by $C_1$–$C_4$ alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexane-diol, 1,4-hexanediol, 1,4-cyclohexanediol, 1,4-cyclohexanedimethylanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate (PET), polypropylene terephthalate and polybutylene terephthalate (PBT), and mixtures of these. Preference is also given to PET and/or PBT which comprise, as other monomer units, up to 1% by weight, preferably up to 0.75% by weight, of 1,6-hexanediol and/or 5-methyl-1,5-pentanediol.

The viscosity number of the polyesters (A) is generally in the range from 50 to 220, preferably from 80 to 160, measured in a 0.5% strength by weight solution in a phenol/o-dichlorobenzene mixture in a weight ratio of 1:1 at 25° C., in accordance with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters which are different from PBT, for example PET. The proportion e.g. of the PET in the mixture is preferably up to 50% by weight, in particular from 10 to 30% by weight, based on 100% by weight of A).

It is also advantageous to use recycled PET materials (also termed scrap PET) in a mixture with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) those known as post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are isolated and purified and then melted and pelletized using an extruder. This usually facilitates handling and free flow, and metering for further steps in processing.

The recycled materials used may either be pelletized or in the form of regrind. The edge length should not be more than 20 mm, preferably less than 10 mm. There may also be some content of fine material in the regrind, which is preferably classified by size using screens.

Because polyesters undergo hydrolytic cleavage during processing (due to traces of moisture), it is advisable to predry the recycled material. The residual moisture content after drying is preferably from 0.01 to 0.7%, in particular from 0.2 to 0.6%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are made of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

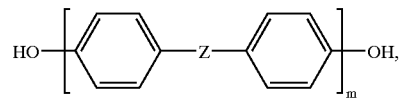

where Z is alkylene or cycloalkylene having up to 8 carbon atoms, arylene having up to 12 carbon atoms, carbonyl, sulfonyl, oxygen or sulfur, or a chemical bond, and m is from 0 to 2. The phenylene groups of the compounds I of the above formula may also have substitution by $C_1$–$C_6$alkyl or alkoxy and fluorine, chlorine or bromine.

Examples of parent substances for these compounds are
dihydroxydiphenyl,
di(hydroxyphenyl)alkane,
di(hydroxyphenyl)cycloalkane,
di(hydroxyphenyl)sulfide,
di(hydroxyphenyl) ether,
di(hydroxyphenyl)ketone,
di(hydroxyphenyl)sulfoxide,
a,a'-di(hydroxyphenyl)dialkylbenzene,
di(hydroxyphenyl)sulfone, di(hydroxybenzoyl)benzene resorcinol and
hydroquinone and also the ring-alkylated and ring-halogenated derivatives of these.

Among these, preference is given to
4,4'-dihydroxydiphenyl,
2,4-di(4'-hydroxyphenyl)2-methylbutane,
a,a'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenylsulfone and
2,2-di(3',5'-dimethyl-4'-hydroxyphenyl)propane
or mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

For the purposes of the present invention, polyesters include polycarbonates obtainable by polymerizing aromatic dihydroxy compounds, in particular 2,2-bis(4-hydroxyphenyl)propane (bisphenol A) or its derivatives, e.g. with phosgene. Corresponding products are known per se and are described in the literature, and many of these products are also commercially available. The amount of the polycarbonates is up to 90% by weight, preferably up to 50% by weight, in particular from 10 to 30% by weight, based on 100% by weight of component A).

It is, of course, also possible to use polyester block copolymers, such as copolyetheresters. Products of this .type are known per se and are described in the literature, e.g. in U.S. Pat. No. 3,651,014. Corresponding products are also available commercially, e.g. Hytrel® (DuPont).

The molding compositions according to the invention comprise, as component B), from 1 to 95% by weight, preferably from 1 to 55% by weight, more preferably from 5 to 50% by weight and in particular from 15 to 30% by weight, of a fibrous filler pretreated with an aminosilane compound and with an epoxy polymer.

Preferred fibrous fillers are carbon fibers, aramid fibers and potassium titanate fibers, and glass fibers in the form of E glass are particularly preferred.

To improve compatibility with the thermoplastic polyester, the fibrous fillers have been surface-pretreated with a silane compound.

Suitable aminosilane compounds are those of formula I $$(X-(CH_2)_n)_k-Si-(O-C_mH_{2m+1})_{4-k} \qquad I$$

where:
X is $NH_2$,
n is an integer from 2 to 10, preferably from 3 to 4,
m is an integer from 1 to 5, preferably from 1 to 2, and
k is an integer from 1 to 3, preferably 1.

Preferred silane compounds are aminopropyltrimethoxysilane, aminobutyltrimethoxysilane, aminopropyltriethoxysilane and aminobutyltriethoxysilane.

The amounts of the silane compounds used for surface coating are generally from 0.05 to 20% by weight, preferably from 0.5 to 1.5% by weight and in particular from 0.8 to 1% by weight (based on B).

The arithmetic mean fiber length prior to incorporation into the molding composition according to the invention is usually from 5 to 25 mm, preferably from 5 to 20 mm and in particular from 10 to 13 mm. The mechanical action which occurs, in particular in the extrusion procedure, frequently causes the fibers to have a lower length after incorporation within the molding composition than prior to incorporation. It is preferable for the fibers to be broken from 1 to 5 times in the course of incorporation. The mean fiber diameter is from 1 to 30 $\mu$m, preferably from 6 to 15 $\mu$m.

Prior to and/or during the application to the fillers, the aminosilanes are mixed with epoxy polymers. The quantitative proportions in the mixture are as desired, preferably from 1/100 to 1/4.

Suitable epoxy polymers, also often called epoxy resins, or polymers containing epoxy groups, are familiar to the skilled worker, and it is therefore not necessary to give further details in this connection (see Saechtling, Kunststoff-Taschenbuch, 23$^{rd}$ edition, 1986, Carl Hanser Verlag, pp. 4,18/19,395,466, 494/495,462).

The amounts usually present of polymers of this type are from 70 to 90% by weight, based on the coating. These materials are preferably applied in solution, preferably in aqueous solution or emulsion, to glass fibers, for example, so that the fibers do not become matted.

Surface-treated glass fibers of this type are obtainable as CS 03 JA FT592 (10 $\mu$m fiber) or CS 03 MA FT592 (13 mm fiber), for example, from Asahi Fiber Glass Co., Ltd.

The molding compositions according to the invention may comprise, as component C), up to 30% by weight, preferably from 1 to 25% by weight and in particular from 2 to 12% by weight, of elastomeric polymers (frequently also called impact modifiers, elastomers or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, 1961), pages 392–406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tri-cyclodienes, such as 3-methyltricyclo[5.2.1.0$^{2,6}$]-3,8-decadiene, or mixtures of these. Preference is given to 1,5-hexadiene, 5-ethylidenenorbornene and dicyclo-pentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These monomers containing dicarboxylic acid derivatives or containing epoxy groups are preferably incorporated into the rubber by adding to the monomer mixture monomers containing dicarboxylic acid groups and/or epoxy groups and having the formula I, II, III or IV $$R^1C(COOR^2)\!=\!C(COOR^3)R^4 \qquad (I)$$

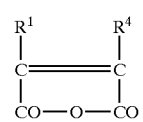
(II)

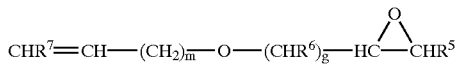
(III)

-continued

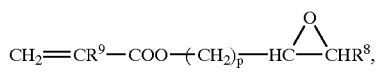
(IV)

where $R^1$ to $R^9$ are hydrogen or alkyl having from 1 to 6 carbon atoms, and m is an integer from 0 to 20, g is an integer from 0 to 10 and p is an integer from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate. Although the latter have no free carboxyl groups their behavior approximates to that of the free acids and they are therefore termed monomers with latent carboxyl groups.

The copolymers are advantageously composed of from 50 to 98% by weight of ethylene, from 0.1 to 20% by weight of monomers containing epoxy groups and/or methacrylic acid and/or monomers containing anhydride groups, the remaining amount being (meth)acrylates.

Particular preference is given to copolymers made from
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by Blackley in the monograph "Emulsion Polymerization".

The emulsifiers and catalysts which may be used are known per se.

In principle it is possible to use homogeneously structured elastomers or those with a shell structure. The shell-like structure is a consequence of the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, and corresponding methacrylates, and butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxyl, latent carboxyl, amino and amide groups, and also functional groups which may be introduced by concomitant use of monomers of the formula

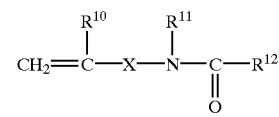

where:
$R^{10}$ is hydrogen or $C_1$–$C_4$-alkyl,
$R^{11}$ is hydrogen or $C_1$–$C_8$-alkyl or aryl, in particular phenyl,
$R^{12}$ is hydrogen, $C_1$–$C_{10}$-alkyl, $C_6$–$C_{12}$-aryl or —$OR^{13}$,
$R^{13}$ is $C_1$–$C_8$ -alkyl or $C_6$–$C_{12}$-aryl, if desired with substitution by O— or N— containing groups,
X is a chemical bond or $C_1$–$C_{10}$-alkylene or $C_6$–$C_{12}$-arylene, or

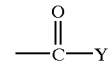

Y is O—Z or NH—Z, and
Z is $C_1$–$C_{10}$-alkylene or $C_6$–$C_{12}$-arylene.

The graft monomers described in EP-A 0 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and di-hydrodicyclopentadienyl acrylate, and also the compounds described in EP-A 0 050 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention is made firstly of raft polymers with a core and at least one outer shell and the following structure:

| Type | Monomers for the core | Monomers for the envelope |
|---|---|---|
| I | 1,3-butadiene, isoprene, n-butyl acrylate, ethylhexyl acrylate or mixtures of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers with reactive groups as described herein |
| V | styrene, acrylonitrile, methyl methacrylate or mixtures of these | first envelope made of monomers as described in I and II for the core second envelope as described in I or IV for the envelope |

The amounts of these graft polymers, in particular ABS polymers and/or ASA polymers, preferably used for impact-modifying PBT are up to 40% by weight, if desired mixed with up to 40% by weight of polyethylene terephthalate. Corresponding blended products are obtainable with the trademark Ultradur® S (previously Ultrablend® S) from BASF AG. ABS/ASA mixtures with polycarbonates are obtainable commercially with the trademark Terblend® (BASF AG).

Instead of graft polymers whose structure has more than one shell it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the above mentioned copolymers, and copolymers of ethylene with comonomers which supply reactive groups.

The elastomers described may also be prepared by other conventional processes, e.g. by suspension polymerization.

Preference is likewise given to silicone rubbers, as described in DE-A 37 25 576, EP-A 0 235 690, DE-A 38 00 603 and EP A 0 319 290.

It is, of course, also possible to use mixtures of the types of rubber listed above.

The thermoplastic molding compositions according to the invention may comprise, as component D), other additives, such as stabilizers, oxidation retarders, agents to prevent decomposition by heat or by ultraviolet light, lubricants, mold-release agents, colorants, such as dyes and pigments, nucleating agents, plasticizers, etc., usually in amounts of up to 40% by weight, preferably up to 30% by weight.

UV stabilizers which should be mentioned and are usually used in amounts of up to 2% by weight, based on the molding composition, are various substituted resorcinols, salicylates, benzotriazoles and benzophenones.

Colorants which may be added are inorganic pigments, such as ultramarine blue, iron oxide and carbon black (in particular for moldings which can be inscribed by laser), organic pigments, such as phthalocyanines, quinacridones and perylenes, and also dyes, such as nigrosine and anthraquinones.

Nucleating agents which may used are sodium phenylphosphinate, aluminum oxide, silicon dioxide and also preferably talc.

The amounts of lubricants and mold-release agents used are usually up to 1% by weight. These are preferably long-chain fatty acids (e.g. stearic acid or behenic acid), salts of these (e.g. Ca stearate or Zn stearate) or montan waxes (mixtures of straight-chain saturated carboxylic acids with chain lengths of from 28 to 32 carbon atoms), or else low-molecular-weight polyethylene waxes or low-molecular-weight polypropylene waxes. Preference is given to esters and amides of long-chain fatty acids with polyhydric alcohols, for example pentaerythritol tetrastearate.

Examples of plasticizers which should be mentioned are dioctyl phthalates, dibenzyl phthalates, butyl benzyl phthalates, hydrocarbon oils and N-(n-butyl)-benzenesulfonamide.

The molding compositions according to the invention may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pp. 484 to 494 and by Wall in "Fluorpolymers" (Wiley Interscience, 1972).

These fluorine-containing ethylene polymers have homogeneous distribution in the molding compositions and preferably have a particle size $d_{50}$ (number average) in the range from 0.05 to 10 µm, in particular from 0.1 to 5 µm. These small particle sizes may particularly preferably be achieved by using aqueous dispersions of fluorine-containing ethylene polymers and incorporating these into a polyester melt.

Other additives which may be mentioned are flame retardants, generally used in amounts of up to 30% by weight, preferably up to 20% by weight. Possible flame retardants here are any of the halogen-containing or halogen-free flame retardants, such as decabromodiphenylethane, phosphorus-containing or nitrogen-containing compounds, such as phosphites, phosphates, melamine, guanidine compounds, etc.

The novel thermoplastic molding compositions may be prepared by processes known per se, by mixing the starting components in customary mixing equipment, such as screw extruders, Brabender mixers or Banbury mixers, followed by extrusion. The extrudate may be cooled and comminuted. It is also possible to premix individual components and then to add the remaining starting materials, either individually and/or likewise mixed. The mixing temperatures are generally from 230 to 290° C.

In one preferred embodiment, components B) to D) are mixed with a polyester prepolymer, compounded and pelletized. The resultant pellets are then condensed continuously or batchwise in the solid phase under an inert gas at below the melting point of component A) until the desired viscosity is reached.

The molding compositions according to the invention may be processed by thermoplastic processes known per se, to give moldings. In particular, they may be produced by thermoforming, extrusion, injection molding, calendering, blow molding, compression molding, sintering or pressure sintering, preferably by injection molding. The moldings which can be produced from the molding compositions of the invention are likewise provided by the present invention.

The novel composite is produced by a process in which at least one partial region of the surface α is welded to one partial region of the surface β, forming a welded region.

For the welding, use may be made of any of the methods known to the skilled worker and suitable for this purpose. Those which have proven successful in this connection are welding by friction, heated tools, ultrasound, laser, hot plate, high frequency and heat impulse. Friction welding is particularly preferred, and among friction welding processes particular preference is given to vibration welding.

In vibration welding the energy for melting and welding the moldings is produced by friction with a particular amplitude of oscillation, using a sufficiently high frictional pressure. Surfaces of the moldings are plastified by the friction and these are positioned either after the friction has ceased or else while the friction continues. The materials of the plastified surfaces of the moldings are at least to some extent combined with one another under a specified pressure.

A vibration welding cycle subdivides into application of pressure, application of friction, jointing and, if desired, holding. The pressure is applied for from 1 to 10 minutes, preferably from 2 to 5 minutes, at from 1 to 20 N/mm$^2$, preferably from 2 to 10 N/mm$^2$. The friction is applied for from 1 to 10 minutes, preferably from 2 to 5 minutes, at a frictional pressure of from 1 to 20 N/mm$^2$, preferably from 2 to 10 N/mm$^2$. The jointing in turn takes place for from 1 to 10 minutes, preferably from 2 to 7 minutes and particularly preferably from 3 to 5 minutes, at a jointing pressure of from 1 to 20 N/mm$^2$, preferably from 2 to 10 N/mm$^2$. The holding takes place for from 1 to 120 minutes, preferably from 2 to 60 minutes and particularly preferably from 10 to 30 minutes, at a holding pressure of from 1 to 20 N/mm$^2$, preferably from 2 to 10 N/mm 2. The oscillating movement preferably takes place at a frequency of from 100 to 500 Hz, preferably from 150 to 400 Hz and particularly preferably from 200 to 300 Hz. The amplitude for the oscillating friction is from 0.01 to 10 mm and preferably from 0.05 to 1 mm.

The novel composites and moldings for producing these are generally sheets surrounded by a surface. It is usual for only partial regions of this surface to be used to form the welded region. The partial regions to be welded generally have an elongated shape. When partial regions of this type are welded to one another a welded region is produced in the form of a welded seam.

The partial regions of the surface of the moldings to be welded are generally plastified to a depth of from 0.1 to 2 mm, preferably from 0.2 to 1 mm and particularly preferably from 0.3 to 0.6 mm.

The plastification depth depends on the material requirements placed upon the material in the welded region. The depth to which the surface of the partial regions of the moldings should be plastified should become greater as the strength requirements placed upon the welded region become higher.

A composite can therefore be obtained by a process which welds at least one partial region of a first surface of the first molding defined above to a second surface of the second molding defined above, forming a welded region.

The invention also provides a composite in which the welded region has at least an ultimate tensile strength of from 25 to 75 N/mm$^2$, preferably from 30 to 60 N/mm$^2$ and particularly preferably from 35 to 55 N/mm$^2$.

The moldings made from the molding compositions according to the invention, and the composites produced from these, have only low levels of emissions of volatile constituents with detectable odor. The odor performance of polymeric materials is assessed to DIN 50011/PV 3900 and applies to components for the interiors of motor vehicles. The result of the odor test to this Standard is generally better than grade 5, preferably better than grade 4.5 and particularly preferably better than grade 4. The carbon emission from the moldings to PV 3341 is generally <50 μgc/g, preferably <40 μgc/g, particularly preferably <35 μgc/g. The lower limit is preferably 20 μgc/g.

The novel composites and the moldings for producing these also have good heat resistance. The Vicat B softening point is generally >120° C., preferably >125° C. and particularly preferably 130° C. The upper limit of the Vicat B softening point is preferably 160° C.

The novel composites and moldings for producing these also have good impact strength, even in cold conditions. This is seen from the fact that the composites formed from the moldings do not fracture, even at low temperatures.

The modulus of elasticity of the non-fiber-reinforced moldings in the composites is generally >2000 MPa, preferably >2200 MPa, and not more than 3500 MPa, their yield stress is generally >40 MPa, preferably >45 MPa, but preferably not more than 80 MPa, they do not fracture when their notched impact strength is tested to ISO 179/1eU and their notched impact strength without prior heat aging to ISO 179/1eA is generally >10 kJ/m², but in each case below 25 kJ/m², and their flowability as MVR (melt volume rate 260° C./5 kp applied force to ISO 1133) is >30 cm³/10 min, preferably >40 cm³/10 min, but not more than 80 cm³/10 min.

When the moldings in the novel composites have fiber-reinforcement, the modulus of elasticity is preferably >2000 MPa, with preference >3500 MPa, and not more than 15,000 MPa, their yield stress is generally >40 MPa, preferably >70 MPa, but preferably not more than 150 MPa, and they do not fracture when their notched impact strength is tested to ISO 179/1eU, and their notched impact strength to ISO 179/1eU is preferably from 30 to 80 kJ/m², and their flowability, as MVR (melt volume ratio 275° C./2.16 kp applied force to ISO 1133) is >10 cm³/10 min, preferably >15 cm³/10 min, but not more than 30 cm³/10 min.

At least one of the moldings in the composites does not show any splintering in the penetration test at −30° C. (2 and 3 mm plaque diameter, to ISO 6603/2), even after heat-aging at 130° C. for 1000 h.

According to the invention moreover the specific gravity given for the composites and for the molding composition or moldings used in the production process is from 1.1 to 1.5, preferably from 1.1 to 1.4 and particularly preferably from 1.20 to 1.30.

Another embodiment of the present invention provides a composite in which at least one of the moldings has one or more of the features i) to vii):

i) carbon emission to PV 3341 <50 μg of carbon per gram;
ii) result of odor test to DIN 50 011PV 3900 better than grade 5;
iii) Vicat B softening point >120° C.;
iv) density from 1.1 to 1.5 g/m³;
v) flowability as melt volume rate at 275° C. with 2.16 kp to ISO 1133 of >10 cm³/10 min;
vi) compared with the value prior to heat-aging, fall-off in impact strength to ISO 179/1 eU after 1000 h of heat-aging at 120° C. of <30%;
vii) elongation at break to DIN 53457 after 1000 h of heat-aging at 130° C. >2%.

One embodiment of a novel composite is composed of at least one fiber-reinforced and one non-fiber-reinforced molding.

The invention also provides a laminate which comprises a novel composite and a polycondensate foam. It is advantageous for there to be a firm bond, via their surfaces, between the molding in the composite and the polycondensate foam. The laminates have excellent adhesion between the foam and the surface of the composite or of the molding, without any need for pretreatment of this surface, for example by a primer. When the foam is pulled away or peeled away from the surface of the molding, cohesive fracture is observed: residues of foam remain on the surface. The polycondensate foam used may be any of the foamable polycondensates known to the skilled worker. In another embodiment of the invention it is preferable for the foam to be applied to the surfaces of the molding without using a primer. Preferred polycondensates here are polyamides and poly-urethanes, particularly polyurethanes. Among the polyurethane foams, particular preference is in turn given to semirigid and flexible foams, which may, if desired, comprise adhesion promoters. A particular polyurethane foam used is Elastoflex® from Elastogran GmbH, Lemförde, Germany. Other suitable polyurethanes may be found Kunststoffhandbuch Vol. 7, Polyurethane, in 3rd edition, 1993, Karl Hanser Verlag, Munich, Vienna.

The molding compositions, moldings, composites, laminates or downstream products according to the invention are also suitable for recycling. The recycled materials obtained from the moldings or molding compositions according to the invention may be reprocessed to give moldings which have at least one of the material properties described above. Based on the molding, the amount of recycled material in moldings of this type made from recycled material is at least 10% by weight, preferably at least 20% by weight and particularly preferably at least 70% by weight. The recycling takes place by processes well known to the skilled worker. In particular, the molding compositions according to the invention make comminution and thermal recycling of the moldings easier. In this context particular preference is given to diene-free molding compositions. The moldings made from recycled material may be processed just as readily as moldings free from recycled material by the welding technique described above, to give composites.

Basically, the process of recycling the structural parts consisting of the moulding compound according to the invention may be carried out in two alternative ways:

(a) a step of recycling the material (material recycling), i.e. the polymer material is recovered in a pure form and is supplied to steps of processing the polymers with simultaneous melting as, for example, steps of extrusion moulding, press moulding, knead moulding or injection molding; or b) a step of recycling the polymer chemically (raw material recycling) through hydrolysis or pyrolysis of the polymer material and subsequent destillative and/or extractive working-up under conditions generally known to a person skilled in this technical field. The raw materials thus recovered may be employed in further processes.

When recycling the composites according to the invention or the structural parts formed thereof, respectively, a precondition of the recycling step sequence are usual process steps like a step of disassembling the materials easy to separate as well as of removing fixing elements (fittings), a step of peeling-off the polyurethane foams (if such foams were applied to the composites of the invention), steps of crushing, separating an classifying, further processing steps as mixing and homogenizing in apparatus suitable for such steps and steps of cleaning and removing dust under process conditions generally known to a person skilled in this field. Such steps are followed by steps of processing the polymer thus obtained in a manner described above.

The properties described above, in particular the heat-aging resistance and the heat resistance, make the molding compositions, moldings, composites, laminates or recycled materials according to the invention, or any two or more of these, suitable for use in products in particular for applications in the interior of motor vehicles or for exterior body parts of motor vehicles.

The invention also provides products preferably for the interior of motor vehicles or for exterior body parts of motor vehicles and comprising molding compositions, moldings, composites, laminates or recycled materials according to the invention, or any two or more of these.

It is particularly preferable for the novel products to be laser-markable. Preferred examples of novel products for the interior of motor vehicles are protective coverings, storage compartments, dashboard supports, door breasts, parts for the center console, and also retaining elements for radio and air-conditioning system, covers for the center console, covers for radio, air-conditioning system and ash tray, prolongations of the center console, storage pockets, storage areas for the driver's door and the passenger's door, storage areas for the center console, components for the driver's and passenger's seats, such as seat coverings, light-switch housings, lamp housings, housings for the vehicle's electrical system, for example the ABS electronics, ASC electronics, stability control electronics, gearbox electronics, seat electronics, mirror motor electronics, window-lifter motor electronics, retractable-roof electronics, airbag triggering electronics, seat-occupation detection electronics, passenger-compartment safety electronics, acceleration-sensor electronics or ignition electronics, and multipoint connectors, plug connectors, lock-system housings, protective covers for wiper housings, lock housings, and also roof racks, defroster ducts, internal mirror housings, sun-roof elements, such as sun-roof frames, covers and protective surrounds for instruments, instrument sockets, upper and lower shells for the steering column, air ducts, air blowers and adapters for personal air-flow devices and defroster ducts, door side coverings, coverings in the knee area, air-outlet nozzles, defroster apertures, switches and levers. These applications are merely examples of possible applications in motor vehicle interiors and are not limited to applications in motor vehicle interiors.

Othe preferred products for exterior body parts are in particular fenders, tailgates, side paneling, bumpers, other paneling, identification plate supports, panels, sunroofs, sunroof frames, and also impact protectors and constituents of these.

Other applications which may be mentioned for other products not restricted to the motor vehicle sector are boat hulls, lawnmower housings, garden furniture, motorcycle parts, camera cases, cases for mobile telephones, tube sections for binoculars, vapor ducts for vapor-extraction hoods, parts for pressure cookers, housings for hot-air grilles and pump housings.

Another preferred group of products which can be produced from the novel composites is that of gas meter housings, wind deflectors, actuating-motor housings, where the actuating motors are preferably used in automotive construction, parts for power drills, parts for ovens, in particular to insulate from heat, for example knobs and oven handles, headlamp parts, in particular nontransparent ones such as housings, screen wiper parts, in particular wiper blades, spoilers, mirror support plates for motor vehicle mirrors, air-inlet grilles, and parts, in particular housings, for washing machine control systems.

The novel composites are also suitable for other moldings used in the household sector, preferably in the kitchen sector. These include bread-baking machines, toasters, table grills, kitchen machinery, electric tin-openers and juice presses. In these products it is preferably the switches, housings, handles and covers which are produced from the novel composites. The novel composites may also be used for moldings in stoves, preferably stove handles, stove knobs and switches The novel composites may also be used in moldings which meet the requirements of the Federal Drug Administration or of comparable national authorities in other countries.

In this sector particular preference is given to packaging for pharmaceutical products and packs for pharmaceutical kits.

The novel composites may also be used in the food and drink packaging sector. Preference is given here to products such as boxes, pots, dishes and other types of container made from the novel composites.

When considering the uses for the novel composites, particular emphasis should be given to their safety in contact with food and drink and to their resistance to fats and liquids, particularly advantageous in parts for household devices.

The use of the composites defined above has proven particularly successful in producing products which are highly heat-resistant. Particular composites of this type are headlamp parts used in the vicinity of the headlamp, in which the temperature when the headlamp is operating can exceed 100° C., preferably 110° C. and particularly preferably 130° C., but is not more than 200° C. Parts of this type may either be glass-fiber-reinforced or not glass-fiber-reinforced.

The advantage of using the novel composites is in particular that no matting of the surface occurs in headlamp parts of this type with a reflecting, metallized surface. The result of using the novel composites is that, even after prolonged operation of the headlamp, there are no deposits on the transparent areas of the headlamp which transmit the light, and the reflective properties of metallized surfaces of these moldings are retained. The novel composites may also be used for producing other headlamp components. These headlamp components include in particular headlamp housings, headlamp frames, headlamp retainers and headlamp guides, preference being given to headlamp frames.

The other advantageous properties of the novel composites, such as low cycle times, no mold-deposit formation during injection molding, and also excellent quality of the metallized surfaces, are, furthermore, retained.

In particular, no clouding of the metallized surface occurs on heating the molding to from 100 to 200° C., preferably from 110° to 180° C. and particularly preferably from 130 to 170° C., and products may therefore be obtained which have metallized surfaces with long-lasting reflective properties.

The use of the novel composites has also proven successful in producing large-surface-area products which are comparatively thin in relation to their surface area and for which excellent demolding performance is demanded. Particular large-surface-area moldings of this type are sunroof rails, body parts, air inlet grilles, dashboard parts, protective covers, air ducts, add-on parts, in particular for the center console as a part of the glove compartment, and protective surrounds for tachometers.

The novel composites and laminates have good heat stability and hydrolysis resistance under changing conditions of temperature and humidity. They can be processed very substantially without any alteration in the polymer matrix (discoloration). They are suitable for producing fibers, films and moldings, in particular for applications in the electrical and electronics sectors, and also for laser inscription. Preferred applications are exterior and interior parts for motor vehicles.

The recycled materials may likewise be a constituent of the above products or form these in their entirety.

The invention also provides a process for establishing at least one of the properties defined above of a molding composition, preferably of one of the molding compositions defined above, for the novel laminates, by varying the concentration of at least one of the components defined above within the ranges defined above. The strength preferably increases with the amount of fibers. It is particularly preferable here to obtain a composite of this type by using, in one molding of the composite and preferably in all of the moldings of the composite, a fiber content of from 15 to 25% by weight, preferably from 17 to 23% by weight, based on the respective molding composition of the respective molding to establish a strength of from 45 to 60 N/mm², preferably from 50 to 55 N/mm², for the composite.

The examples below illustrate the invention in greater detail:

EXAMPLES

The components of the mixing specifications given in Table 1 are listed below:

PSAN: styrene-acrylonitrile copolymer with 35% by weight of acrylonitrile

Mold-release agent: pentaerythritol tetrastearate (Loxiol VPG 861 from Henkel KGaA)

Nucleating agent: talc

Carbon black: Black Pearls 880

The components were blended as in Table 1 in a twin-screw extruder at from 250 to 270° C. and extruded.

TABLE 1

| | Mixing specifications (data in parts by weight) | |
|---|---|---|
| Starting material | Reference | Molding composition I |
| PBT | ad 100 | ad 100 |
| Standard glass fiber | 20 | |
| Glass fiber with size | | 20 |
| ASA | 9 | 9 |
| PSAN | 9 | 9 |
| Mold-release agent | 0.5 | 0.5 |
| Nucleating agent | 0.1 | 0.1 |
| Carbon black | 1 | 1 |

Table 2 gives the vibration welding conditions and the results of the material tests carried out. For this, use was made of low-warpage test specimens in the form of small pots of 50 mm external diameter, and the vibration welding machine used had an oscillation frequency of about 250 Hz.

TABLE 2

| | | | Vibration welding experiments | | | | | |
|---|---|---|---|---|---|---|---|---|
| Measurement | Amplitude | Extent of melting specified/mach/actual | Welding pressure | Friction application time | Jointing time | Holding time | Ultimate tensile strength X/s | Strength |
| Unit | mm | mm | N/mm³ | s | s | s | N | N/mm³ |
| Reference | 0.7 | 0.6/0.68/0.96 | 2.21/0.80 | 4.01 | 6.4 | 5.0 | 17000/530 | 40.9 |
| Molding comp. 1 | 0.7 | 0.7/0.78/1.08 | 2.21/0.8 | 4.01 | 7.4 | 5.0 | 17600/205 | 42.4 |

PBT: polybutylene terephthalate with a viscosity number of 130 ml/g and with a carboxyl end group content of 34 mval/kg (Ultradur B 4500 from BASF AG) (VN measured in a 1:1 mixture of phenol and o-dichlorobenzene) at 0.5% strength by weight at 25° C. to ISO 1628.

Glass fiber with size: glass fiber with monomeric aminosilane/epoxy polymer size with a mean fiber diameter of 10 μm (Asahi Fiber Glass Co., Ltd., type CS 03 JA FT 592).

Standard glass fiber: chopped glass fiber with mean-fiber diameter of 10 μm and with a size made from polyurethane/epoxy polymer (3540 from PPG Ind. Fiberglass B.V.)

ASA: emulsion graft rubber made from butyl acrylate rubber (40% by weight, based on the emulsion graft rubber) with poly-(styrene-co-acrylonitrile) graft envelope (60% by weight, based on the emulsion graft rubber with 75% by weight of styrene and 25% by weight of acrylonitrile, based in each case on the graft envelope)

We claim:

1. A composite composed of at least one first molding and one second molding, where the first molding and the second molding have been immovably bonded to one another via at least one partial region of one surface α of the first molding and of one surface β of the second molding, via a welded region, and where, based on the first molding, at least 50% by weight of the first molding is composed of a molding composition comprising:
   A) from 5 to 99% by weight of a polyester,
   B) from 1 to 95% by weight of a fibrous filler pretreated with an aminosilane compound and with an epoxy polymer,
   C) from 0 to 30% by weight of an elastomeric polymer, and
   D) from 0 to 40% by weight of other additives,
where the total of the percentages by weight of components A) to D) is 100%.

2. A composite as claimed in claim 1, with a molding composition comprising from 20 to 98% by weight of component A),
from 1 to 55% by weight of component B), and
from 1 to 25% by weight of component C).

3. A composite as claimed in claim 1, where component A) comprises a mixture of polybutylene terephthalate and polyethylene terephthalate and/or from a polycarbonate.

4. A composite as claimed in claim 1, where the arithmetic mean fiber length of component B) is from 5 to 25 mm.

5. A composite as claimed in claim 1, where component C) comprises from 0.1 to 30% by weight, based on 100% by weight of C), of functional monomers.

6. A composite as claimed in claim 1, where at least one of the moldings exhibits one or more of the following features i) to vii):

i) carbon emission to PV 3341 <50 µg of carbon per gram;
ii) result of odor test to DIN 50 011/PV 3900 better than grade 5;
iii) Vicat B softening point >120° C.;
iv) density from 1.1 to 1.5 g/m$^3$;
flowability as melt volume rate at 275° C. with 2.16 kp to ISO 1133 of >10 cm$^3$/10 min;
vi) compared with the value prior to heat-aging, fall-off in impact strength to ISO 179/1 eU after 1000 h of heat-aging at 120° C. of <30%;
vii) elongation at break to DIN 53457 after 1000 h of heat-aging at 130°>2%.

7. A process for producing a composite as claimed in claim 1, in which at least one partial region of the surface α is welded to one partial region of the surface β, forming a welded region.

8. A process as claimed in claim 7, where the welded region has at least an ultimate tensile strength of from 25 to 75 N/mm$^2$.

9. A composite which can be obtained by a process where at least one partial region of a surface α of the first molding defined in claim 1 is welded to one partial region of a surface β of the second molding defined in claim 1, forming a welded region.

10. A composite as claimed in claim 1, where the welded region has at least an ultimate tensile strength of from 25 to 75 N/mm$^2$.

11. A process for recycling moldings or molding compositions, each of which comprises a composite as claimed in claim 1.

12. A recycled material which can be obtained from moldings or molding compositions, each of which comprises a composite as claimed in claim 1.

13. The method of using a recycled materials as claimed in claim 12.

14. A product or a laminate, in each case comprising recycled materials as claimed in claim 12.

15. The method of using a composite as claimed in claim 1.

16. A product or a laminate, in each case comprising a composite as claimed in claim 1.

17. The method of using products or laminates as claimed in claim 16, in motor vehicles.

18. The method of using a composite as claimed in claim 1, in motor vehicles.

* * * * *

UNITED STATES PATENT AND TRADEMARK OFFICE
CERTIFICATE OF CORRECTION

PATENT NO. : 6,521,326 B1
DATED : February 18, 2003
INVENTOR(S) : Fischer et al.

Page 1 of 1

It is certified that error appears in the above-identified patent and that said Letters Patent is hereby corrected as shown below:

<u>Column 19,</u>
Line 22, before "flowability" insert -- v) --.

Signed and Sealed this

Tenth Day of June, 2003

JAMES E. ROGAN
*Director of the United States Patent and Trademark Office*